(12) United States Patent
Xu et al.

(10) Patent No.: US 9,108,703 B2
(45) Date of Patent: Aug. 18, 2015

(54) INTELLIGENT DRAFT GAUGE FOR SHIPS

(71) Applicant: WUHAN JINGCISHAN MECHANICAL & ELECTRICAL MANUFACTURING CO., LTD., Wuhan (CN)

(72) Inventors: Chuanren Xu, Wuhan (CN); Guohao Wang, Wuhan (CN)

(73) Assignee: Wuhan Jingcishan Mechanical & Electrical Manufacturing Co., Ltd., Wuhan (CN)

( * ) Notice: Subject to any disclaimer, the term of this patent is extended or adjusted under 35 U.S.C. 154(b) by 268 days.

(21) Appl. No.: 13/899,558

(22) Filed: May 21, 2013

(65) Prior Publication Data

US 2013/0247659 A1  Sep. 26, 2013

Related U.S. Application Data

(63) Continuation-in-part of application No. PCT/CN2011/078263, filed on Aug. 11, 2011.

(51) Int. Cl.
*B63B 39/12* (2006.01)
*G01G 5/02* (2006.01)

(52) U.S. Cl.
CPC . *B63B 39/12* (2013.01); *G01G 5/02* (2013.01)

(58) Field of Classification Search
CPC ............. B63B 39/12; B63B 9/00; G01G 5/00
USPC ............. 73/311, 178, 313; 114/343, 221, 124
See application file for complete search history.

(56) References Cited

U.S. PATENT DOCUMENTS

| | | | | |
|---|---|---|---|---|
| 2,379,902 A | * | 7/1945 | Harris | 114/46 |
| 2,920,516 A | * | 1/1960 | Moore | 81/15.8 |
| 3,813,941 A | * | 6/1974 | Miguel et al. | 73/313 |
| 4,872,118 A | * | 10/1989 | Naidenov et al. | 701/124 |
| 6,836,746 B2 | * | 12/2004 | Coder et al. | 702/174 |
| 2011/0259440 A1 | * | 10/2011 | Kawashima et al. | 137/234.6 |

FOREIGN PATENT DOCUMENTS

CN  101195405 A  *  6/2008  ............. B63B 39/12

OTHER PUBLICATIONS

Meaasurement of bulk cargoes Carefully to Carry May 2008.*

* cited by examiner

*Primary Examiner* — Laura Martin
*Assistant Examiner* — Suman K Nath
(74) *Attorney, Agent, or Firm* — Matthias Scholl P.C.; Matthias Scholl

(57) ABSTRACT

A draft gauge, including: four balancing float tanks, a central control room, a first and second connection beam, a pump-valve chamber, a longitudinal connection beam, flexible centering brackets, a lateral connection beam, a scanning sensor, and a side scanner. The four balancing float tanks are arranged at two sides of a hull with every two balancing float tanks arranged at each side of the hull. The flexible centering brackets are fixed on an inner side of the first connection beam and on an inner side of the second connection beam, respectively. Every two balancing float tanks at opposite sides of the hull are connected via the lateral connection beam. The scanning sensors are evenly arranged on the lateral connection beam. The side scanner is arranged on one side of the balancing float tank in a close proximity to the hull.

10 Claims, 4 Drawing Sheets

INTELLIGENT DRAFT GAUGE FOR SHIPS

CROSS-REFERENCE TO RELATED APPLICATIONS

This application is a continuation-in-part of International Patent Application No. PCT/CN2011/078263 with an international filing date of Aug. 11, 2011, designating the United States, now pending, and further claims priority benefits to Chinese Patent Application No. 201010575191.6 filed Dec. 2, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to an intelligent draft gauge for ships.

2. Description of the Related Art

A typical method for knowing a ship's draft is to observe a draft mark of a ship's hull, however, the method is disadvantageous because the draft mark is difficult to read accurately, the process is time consuming and labor intense, and thus inconvenient. Some ships are not provided with draft marks. As such, an improved method that solves problems of measuring the draft and the load of ships in transporting is desired.

SUMMARY OF THE INVENTION

In view of the above-described problems, it is one objective of the invention to provide an intelligent draft gauge for ships that overcomes the drawbacks of directly observing the draft mark arranged on the hull, and is particularly applicable for ships provided with unclear or no draft mark; furthermore, a ship load can be calculated by using the ship's draft.

To achieve the above objective, in accordance with one embodiment of the invention, there is provided an intelligent draft gauge for ships, comprising: four balancing float tanks, a central control room, a first connection beam, a second connection beam, a pump-valve chamber, a longitudinal connection beam, flexible centering brackets, a lateral connection beam, a scanning sensor, and a side scanner. The four balancing float tanks are arranged at two sides of a hull with every two balancing float tanks arranged at each side of the hull. The central control room is arranged between and connected to two balancing float tanks arranged at one side of the hull via the connection beam. The pump-valve chamber is arranged between and connected to the other two balancing float tanks arranged at the other side of the hull via another connection beam. The longitudinal connection beam is arranged beneath and connected to every two balancing float tanks arranged at the same side of the hull. The flexible centering brackets are fixed on an inner side of the first connection beam and on an inner side of the second connection beam, respectively, the inner side referring being the side in a close proximity to the hull. Every two balancing float tanks arranged at opposite sides of the hull are connected via the lateral connection beam. The scanning sensors are evenly arranged on the lateral connection beam. The side scanner is arranged on one side of the balancing float tank in a close proximity to the hull.

In a class of this embodiment, the balancing float tank is provided with a plurality of transparent tube-type level meter. The transparent tube-type level meters are disposed on a front end of the balancing float tank in a close proximity to a front part of the hull and on a rear end of the balancing float tank in a close proximity to a rear part of the hull, respectively.

In a class of this embodiment, a ranging wheel is disposed on a movable end of each of the flexible centering brackets.

In a class of this embodiment, each of the balancing float tanks is provided with a navigational pier column; and each navigational pier column is disposed on a side of each of the balancing float tanks in a close proximity to the hull.

In a class of this embodiment, the ranging wheel is provided with a magnetic antiskid rim.

In a class of this embodiment, the flexible centering bracket and the ranging wheel are connected to a measurement display system, and further connected to a processor through the measurement display system. The side scanner and the scanning sensor are connected to a scanning display system, and further connected to the processor through the scanning display system.

Advantages of the invention are summarized as follows:
1) the ships' draft is electronically scanned and is observed in a monitor ship or a monitor station, rather than observing a draft mark from a small boat;
2) the resolution of automatic reading of the draft gauge of the invention is 2 mm, which is more accurate than a conventional draft mark arranged on the hull having a resolution of 5 cm;
3) the draft gauge is observed from the display screen of the computer, rather than observing from an uneven wave surface;
4) the draft gauge of the invention is capable of automatic reading which is more conducive to self-control management than the conventional manual reading; and
5) the draft gauge of the invention is provided with a quantity transmission system, thereby improving the measuring accuracy and the reliability.

In total, the intelligent draft gauge for ships of the invention is safe, convenient, time-saving, accuracy, economical and practical.

BRIEF DESCRIPTION OF THE DRAWINGS

The invention is described hereinbelow with reference to the accompanying drawings, in which.

Figure 1:
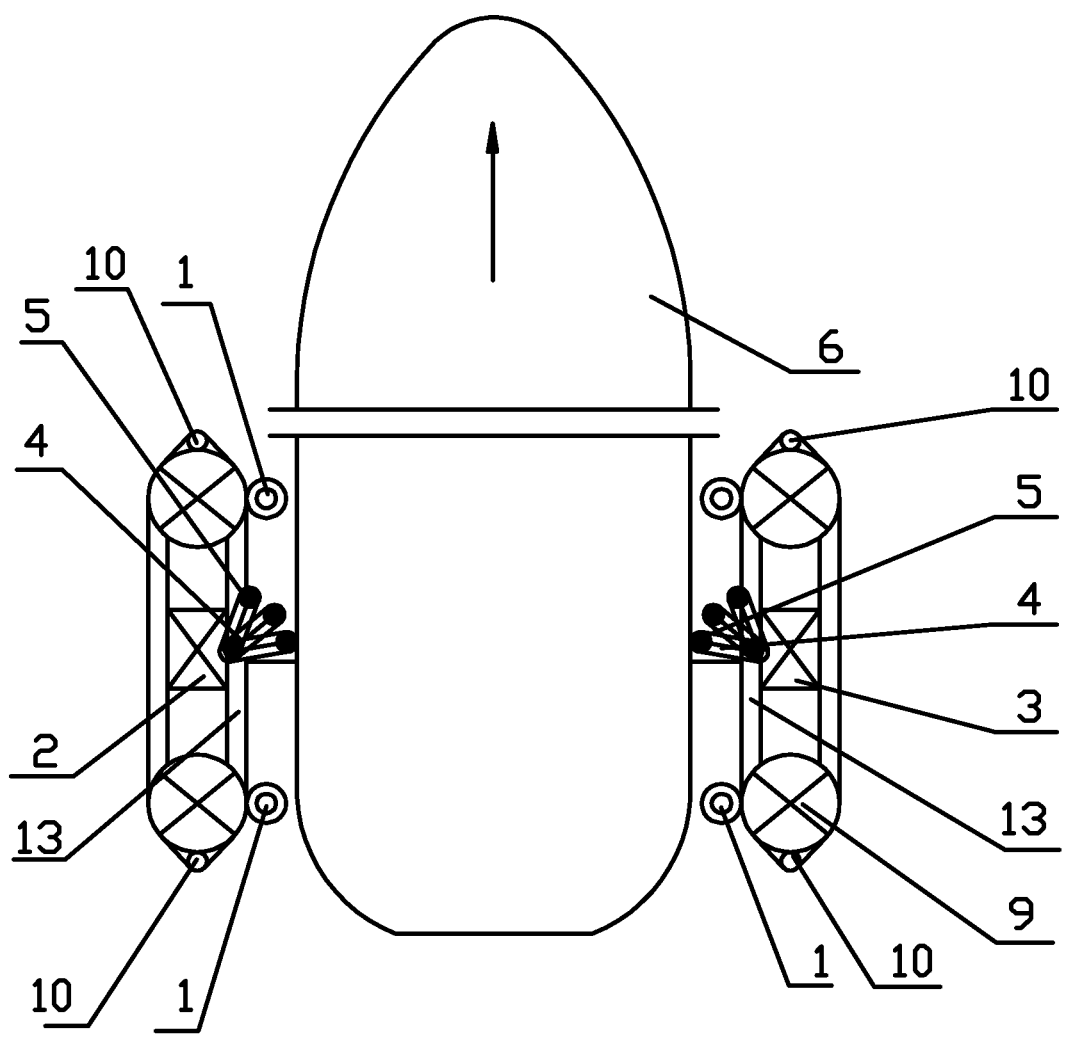
FIG. 1 is a top view of an intelligent draft gauge for ships in accordance with one embodiment of the invention.

In the drawings, the following reference numbers are used: 1. Navigational pier column; 2. Central control room; 3. Pump-valve chamber; 4. Flexible centering bracket; 5. Ranging wheel; 6. Hull; 7. Scanning sensor; 8. Side scanner; 9. Balancing float tank; 10. Transparent tube-type level meter; 11. Longitudinal connection beam; 12. Lateral connection beam; 13. Connection beam; 14. Measurement display system; 15. Scanning display system; and 16. Processor.

DETAILED DESCRIPTION OF THE EMBODIMENTS

For further illustrating the invention, experiments detailing an intelligent draft gauge for ships are described below. It should be noted that the following examples are intended to describe and not to limit the invention. Arrows in the FIG. 1 indicate a moving direction of the ship.

Figure 2:
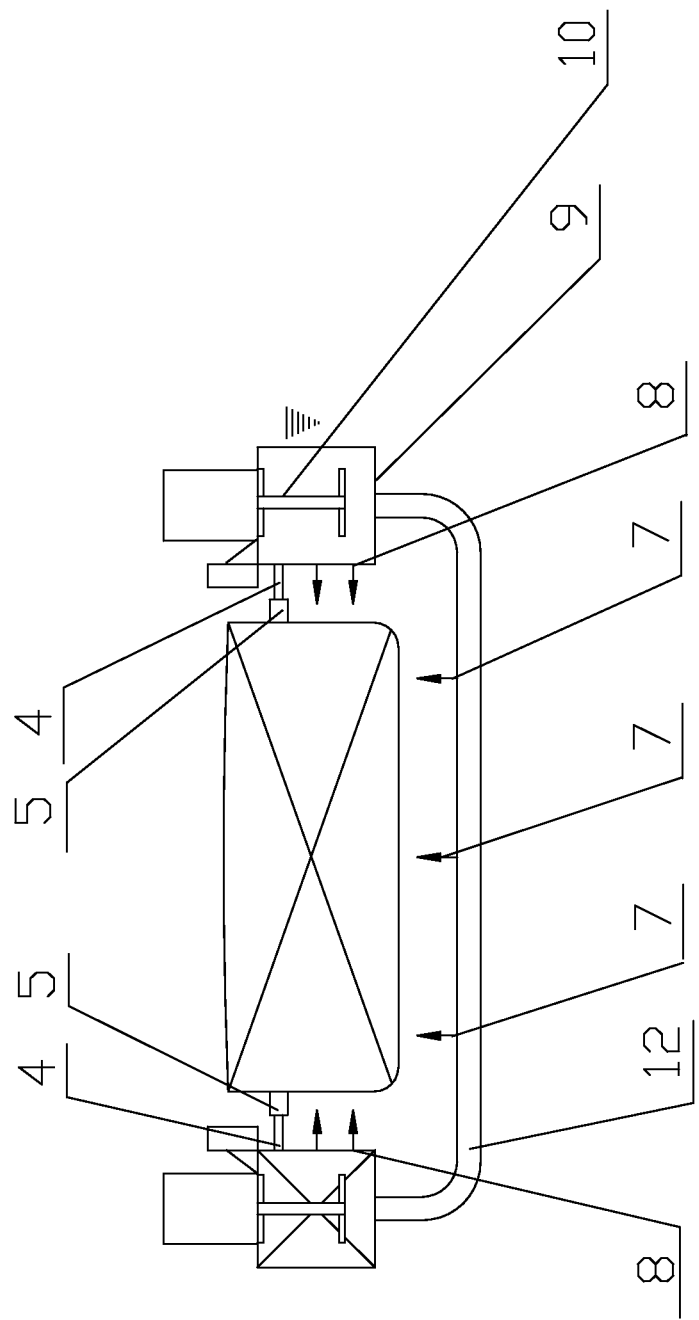
FIG. 2 is a cross section view of an intelligent draft gauge for ships in accordance with one embodiment of the invention.
Figure 3:
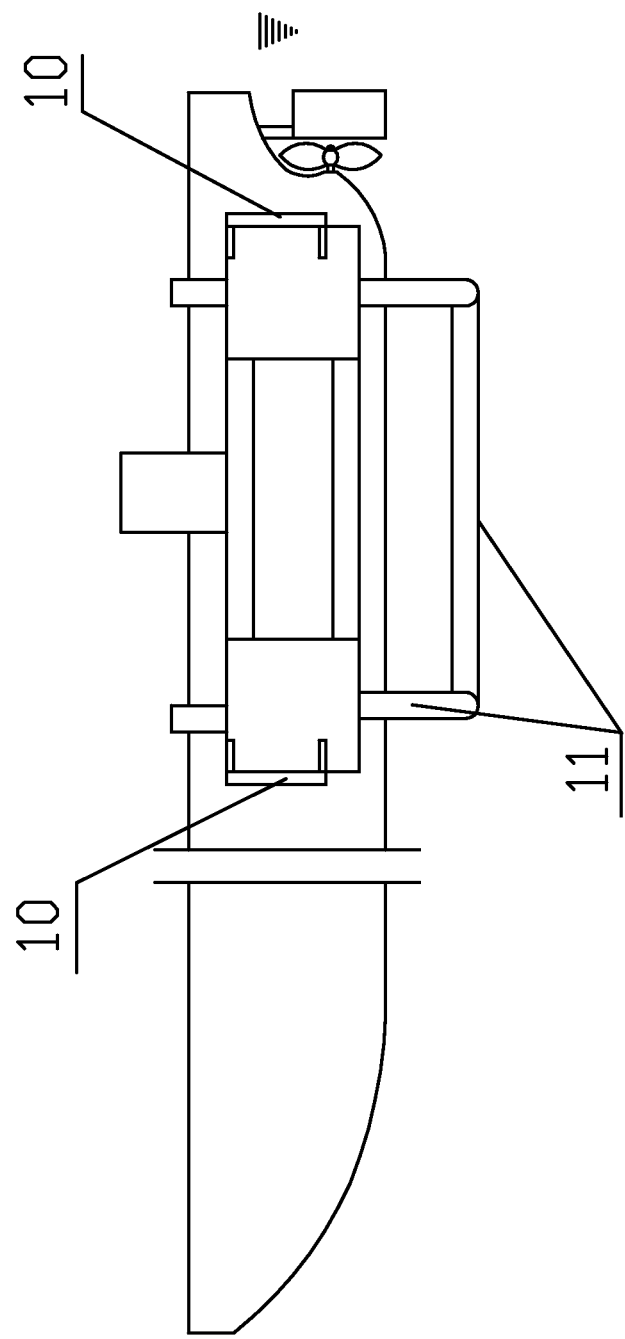
FIG. 3 is a lateral view of an intelligent draft gauge for ships in accordance with one embodiment of the invention.

An intelligent draft gauge, comprises: four balancing float tanks 9, a central control room 2, a first and second connection beam 13, a pump-valve chamber 3, a longitudinal connection beam 11, a flexible centering bracket 4, a lateral connection beam 12, a scanning sensor 7, and a side scanner 8. The four balancing float tanks 9 are arranged at two sides of a hull 6 of a ship with every two balancing float tanks 9 arranged at each side of the hull 6. The central control room 2 is arranged between and connected to two balancing float tanks 9 arranged at one side of the hull 6 via the first connection beam 13. The pump-valve chamber 3 is arranged between and connected to the other two balancing float tanks 9 arranged at the other side of the hull 6 via the second connection beam 13. The longitudinal connection beam 11 is arranged beneath and connected to every two balancing float tanks 9 arranged at the same side of the hull 6. The flexible centering brackets 4 are fixed on the connection beam 13 connected to a side of the central control room 2 in a close proximity to the hull 6 and on the connection beam 13 connected to a side of the pump-valve chamber 3 in a close proximity to the hull 6, respectively. Every two balancing float tanks 9 arranged at opposite sides of the hull 6 are connected via the lateral connection beam 12. The scanning sensor 7 is evenly arranged on the lateral connection beam 12. The side scanner 8 is arranged on one side of the balancing float tank 9 in a close proximity to the hull 6, as shown in FIGS. 1-3.

The balancing float tank 9 is provided with a plurality of transparent tube-type level meter 10. The transparent tube-type level meters 10 are disposed on a front end of the balancing float tank 9 in a close proximity to a front part of the hull 6 and on a rear end of the balancing float tank 9 in a close proximity to a rear part of the hull 6, respectively. A ranging wheel 5 is disposed on a movable end of each of the flexible centering brackets 4. Each of the balancing float tanks 9 is provided with a navigational pier column 1; and each navigational pier column 1 is disposed on a side of each of the balancing float tanks 9 in a close proximity to the hull 6. The ranging wheel 5 is provided with a magnetic antiskid rim, as shown in FIGS. 1-3.

Figure 4:
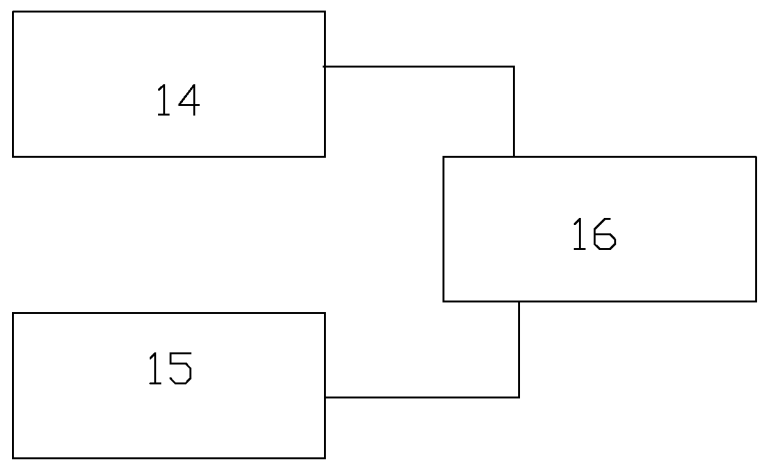
FIG. 4 is another lateral view of an intelligent draft gauge for ships in accordance with one embodiment of the invention.

The flexible centering bracket 4 and the ranging wheel 5 are connected to a measurement display system 14, and further connected to a processor 16 through the measurement display system 14. The side scanner 8 and the scanning sensor 7 are connected to a scanning display system 15, and further connected to the processor 16 through the scanning display system 15, as shown in FIG. 4.

The tube-type level meter and the balancing float tanks are used to monitor a horizontal condition of the system, and measure a reference point of an output horizontal plane, thereby calculating a draft depth, a hull length (not including two ends of the hull), and a hull width.

After the ship to be measured enters into the system, the flexible centering bracket is automatically centered around the ship. The ranging wheel evenly rolls on the broadside of the hull, so that a basic length of the broadside (not including two ends of the hull) is measured, and a hull width is calculated by using a swing angle of the flexible centering bracket. Besides, these measuring signals control the scanning sensor to start a synchronous scanning.

The side scanner and the scanning sensor are used to measure distances from monitor points to the broadside of the hull and to the bottom of the hull, and further calculate the draft depth of the hull according to the relationship between the reference point of the horizontal plane and the monitor points. The value of the draft of the hull is then accurately read.

The intelligent draft gauge of the invention has precise requirements on a sailing speed of the ship, an adjustment level of the measuring system, and a contact force of the flexible centering bracket to assure a constant vertical distance between the scanning sensor and the bottom of the hull and to eliminate errors. The system belongs to a displacement measuring device and requires periodic examination by a metrology department to assure the accuracy of the quantity transmission and to establish a statutory management program.

Working principle of the intelligent draft gauge of the invention is as follows: the measuring system, also called the measuring platform, is adjusted to be in a balanced condition by using the tube-type level meter, the balancing float tank, the navigational pier column, and the pump-valve chamber. The measuring system is anchored or fixed at a proper position in a channel.

The ranging wheel and the flexible centering bracket are automatically centered around a ship to be measured, and send out working command to the scanning sensor to start and stop the scanning program. The network system sends out the scanning signals comprising the hull width and the hull draft to the computer processor, so that data of the hull draft is automatically read.

The draft gauge is capable of measuring the hull width by measuring an angle between swing bars arranged on two sides of the ranging wheel. The swing bar is an elastic swing bar and is capable of centering the measuring system floated on the water around the hull of the ship, thereby improving the accuracy of the measurement.

The width and depth scanning display system, the ranging wheel and the flexible centering bracket, the computer network system calculate the draft of the ship according to related data and block coefficients, and further calculate the ship load according to the water density and shipment chart.

In combination with data including the ship length and the block coefficients, the water displacement of the ship is calculated; and the load and a self-weight of the ship are accurately calculated according to the water density.

It should be noted that in FIGS. 1-4, the ship is shown to clearly explain the intelligent draft gauge of the invention, but is not included by the draft gauge.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A draft gauge, comprising:
   a) four balancing float tanks (9);
   b) a central control room (2);
   c) a first connection beam (13);
   d) a second connection beam (13);
   e) a pump-valve chamber (3);
   f) a longitudinal connection beam (11);
   g) flexible centering brackets (4);
   h) a lateral connection beam (12);
   i) a scanning sensor (7); and
   j) a side scanner (8);
   wherein
   the four balancing float tanks (9) are arranged at two sides of a hull (6) with every two balancing float tanks (9) arranged at each side of the hull (6);

the central control room (2) is arranged between and connected to two balancing float tanks (9) arranged at one side of the hull (6) via the first connection beam (13);

the pump-valve chamber (3) is arranged between and connected to the other two balancing float tanks (9) arranged at the other side of the hull (6) via the second connection beam (13);

the longitudinal connection beam (11) is arranged beneath and connected to every two balancing float tanks (9) arranged at the same side of the hull (6);

the flexible centering brackets (4) are fixed on an inner side of the first connection beam (13) and on an inner side of the second connection beam (13), respectively, the inner side being in a close proximity to the hull (6);

every two balancing float tanks (9) at opposite sides of the hull (6) are connected via the lateral connection beam (12);

the scanning sensor (7) is evenly arranged on the lateral connection beam (12); and the side scanner (8) is arranged on an inner side of the balancing float tank (9).

2. The draft gauge of claim 1, wherein
the balancing float tank (9) is provided with a plurality of transparent tube-type level meter (10); and
the transparent tube-type level meters (10) are disposed on a front end of the balancing float tank (9) in a close proximity to a front part of the hull (6) and on a rear end of the balancing float tank (9) in a close proximity to a rear part of the hull (6), respectively.

3. The draft gauge of claim 1, wherein a ranging wheel (5) is disposed on a movable end of each of the flexible centering brackets (4).

4. The draft gauge of claim 2, wherein a ranging wheel (5) is disposed on a movable end of each of the flexible centering brackets (4).

5. The draft gauge of claim 1, wherein each of the balancing float tanks (9) is provided with a navigational pier column (1); and each navigational pier column (1) is disposed on one side of each of the balancing float tanks (9) in a close proximity to the hull (6).

6. The draft gauge of claim 2, wherein each of the balancing float tanks (9) is provided with a navigational pier column (1); and each navigational pier column (1) is disposed on a side of each of the balancing float tanks (9) in a close proximity to the hull (6).

7. The draft gauge e of claim 3, wherein the ranging wheel (5) is provided with a magnetic antiskid rim.

8. The draft gauge of claim 4, wherein the ranging wheel (5) is provided with a magnetic antiskid rim.

9. The draft gauge of claim 3, wherein
the flexible centering bracket (4) and the ranging wheel (5) are connected to a measurement display system (14), and further connected to a processor (16) through the measurement display system (14); and
the side scanner (8) and the scanning sensor (7) are connected to a scanning display system (15), and further connected to the processor (16) through the scanning display system (15).

10. The draft gauge of claim 4, wherein
the flexible centering bracket (4) and the ranging wheel (5) are connected to a measurement display system (14), and further connected to a processor (16) through the measurement display system (14); and
the side scanner (8) and the scanning sensor (7) are connected to a scanning display system (15), and further connected to the processor (16) through the scanning display system (15).

\* \* \* \* \*